(12) United States Patent
Jacobson et al.

(10) Patent No.: US 7,790,822 B2
(45) Date of Patent: Sep. 7, 2010

(54) HYPERBRANCHED MALEIC ANHYDRIDE-DIENE POLYMERS

(75) Inventors: Stephen Ernest Jacobson, Hockessin, DE (US); Patricia Metzger Cotts, Wilmington, DE (US)

(73) Assignee: E.I. du Pont de Nemours and Company

( * ) Notice: Subject to any disclaimer, the term of this patent is extended or adjusted under 35 U.S.C. 154(b) by 0 days.

(21) Appl. No.: 12/503,416

(22) Filed: Jul. 15, 2009

(65) Prior Publication Data

US 2010/0063231 A1 Mar. 11, 2010

Related U.S. Application Data

(62) Division of application No. 11/397,667, filed on Apr. 4, 2006, now Pat. No. 7,579,420.

(51) Int. Cl.
C08F 222/06 (2006.01)
C08F 236/06 (2006.01)

(52) U.S. Cl. .................. 526/272; 526/224; 526/338; 526/339; 526/340.3

(58) Field of Classification Search .................. 526/224, 526/272, 338, 339, 340.3
See application file for complete search history.

(56) References Cited

U.S. PATENT DOCUMENTS

| | | | |
|---|---|---|---|
| 3,261,815 | A | 7/1966 | Dowbenko |
| 5,001,004 | A | 3/1991 | Fitzgerald et al. |
| 5,136,014 | A | 8/1992 | Figuly |
| 5,212,043 | A | 5/1993 | Yamamoto et al. |
| 5,418,301 | A | 5/1995 | Hult et al. |
| 5,654,068 | A | 8/1997 | Pechhold |
| 5,707,708 | A | 1/1998 | Pechhold |
| 5,834,088 | A | 11/1998 | Pechhold |
| 6,020,457 | A | 2/2000 | Klimash et al. |
| 6,100,350 | A | 8/2000 | Wilczek et al. |
| 6,294,631 | B1 | 9/2001 | Brant |
| 6,297,338 | B1 | 10/2001 | Cotts et al. |
| 6,699,949 | B2 | 3/2004 | Chung |
| 6,750,306 | B2 | 6/2004 | Brant |
| 6,790,461 | B2 | 9/2004 | Miyata et al. |
| 6,897,278 | B2 | 5/2005 | Wilczek |

FOREIGN PATENT DOCUMENTS

| | | |
|---|---|---|
| GB | 1255838 | 12/1971 |
| WO | WO 92/10605 | 6/1992 |
| WO | WO 03/036258 A2 | 5/2003 |

OTHER PUBLICATIONS

Fujimori et al., *Cyclo-copolymerization of 1,6-Dienes with Monoolefin. Copolymerization of Diallyl Ether with Maleic Anhydride*; Makromol. Chem., vol. 179, 859-863 (1978).

Kodaira et al., *Cyclocopolymerization of maleic anhydride with 1,5-hexadiene and 2,5-dimethyl-1,5-hexadiene*; Makromol. Chem., vol. 188, 281-294 (1987).

Turner et al, *All-Aromatic Hyperbranched Polyesters with Phenol and Acetate End Groups: Synthesis and Characterization*, Macromolecules, vol. 26, 4617-4623 (1993).

Turner et al., *Hyperbranched Aromatic Polyesters with Carboxylic Acid Terminal Groups*; Macromolecules, vol. 27, 1611-1616 (1994).

Frechet et al., *Self-Condensing Vinyl Polymerization ; An Approach to Dendritic Materials*; Science, vol. 269, 1080-1083 (Aug. 25, 1995).

Beuermann et al., *Critically-Evaluated Propagation Rate Coefficients in Free Radical Polymerizations—II. Alkyl Methacrylates*; Pure & Applied Chemistry, vol. 70, No. 7, pp. 1415-1418, (1988) Great Britain.

Guan et al., *Chain Walking: A New Strategy to Control Polymer Topology*, Science, vol. 283, pp. 2059-2062, (Mar. 26, 1999), American Association for the Advancement of Science.

Cotts et al., *Novel Branching Topology in Polyethylene As Revealed by Light Scattering and $^{13}C$ NMR*, Macromolecules, published on the Web (Jul. 11, 2000), American Chemical Society.

Liu et al., *Radical Alternating Copolymerization: A Strategy for Hyperbranched Materials*; Journal of Polymer Science: Part A: Polymer Chemistry, vol. 38, 3074-3085 (2000).

Liu et al., *Hyperbranched Polymers with Maleic Functional Groups As Radical Crosslinkers*; Hyperbranching Polymers, pp. 964-972 (Jan. 16, 2001), Dept. of Polymer Technology, Abo Akademi University, Abo, Finland.

Liu et al., *Hyperbranched Poly[allyl ether-alt-maleic anhydride] Produced by the Self-Condensing Alternating Copolymerization Approach*; Macromolecules, vol. 34, 5067-5070 (2001).

Yoon et al., *Recent Advances in Polymer Reaction Engineering: Modeling and Control of Polymer Properties*; Korean J. Chem. Eng., 21(1), 147-167 (2004).

Ishida, Chapter 3: *Properties of Polymers*, Dept. Of Macromolecular Science, Case Western Reserve University, Cleveland, Ohio. Handout3 for EMAC270, "Introduction to Polymer Science", course No. EMAC270, for the Fall Semester, 1999, available at http://filer.case.edu/org/emac270/Chapter3.pdf, accessed Nov. 3, 2008.

Lu, et al., *Maleic Anhydride Modified Polypropylene with Controllable Molecular Structure: New Synthetic Route via Borane-Terminated Polypropylene*, Macromolecules, vol. 31, 5943-5946 (1998).

Lu, et al., *Synthesis of Maleic Anhydride Grafted Polyethylene and Polypropylene, with controlled Molecular Structures*, J. Polym. Sci. Part A: Polym. Chem., vol. 38, 1337-1343 (2000).

Meunier, Chapter 46: *Molecular Weight Determinations*, Handbook of Instrumental Techniques for Analytical Chemistry, Frank A. Settle, editor, Jun. 4, 1997, pp. 853-866. Publisher: Prentice Hall, Inc., Upper Saddle River, New Jersey, USA.

*Primary Examiner*—Helen L. Pezzuto
(74) *Attorney, Agent, or Firm*—Kathryn M. Sanchez

(57) ABSTRACT

A hyperbranched polymer having pendent olefinic groups and comprising polymer units derived from one or more terminally-unsaturated, acyclic aliphatic diene and polymer units derived from maleic anhydride. Optionally, the hyperbranched polymer may further comprise polymer units derived from one or more 1-alkenes and/or a chain transfer agent. A process to prepare the hyperbranched polymer comprises contacting maleic anhydride with at least one terminally unsaturated acyclic aliphatic diene having at least 7 carbon atoms in the presence of an effective amount of a radical initiator in an aprotic solvent under dilute conditions.

12 Claims, 3 Drawing Sheets

HYPERBRANCHED MALEIC ANHYDRIDE-DIENE POLYMERS

This is a divisional application of Ser. No. 11/397,667, filed Apr. 4, 2006 now U.S. Pat. No. 7,579,420.

FIELD OF THE INVENTION

This invention relates to a novel hyperbranched polymer, and a process for preparation of said hyperbranched polymer. Said hyperbranched polymer may be used to provide stain resistance to substrates.

BACKGROUND OF THE INVENTION

Textile substrates, such as nylon (polyamide) carpeting, upholstery fabric and similar wool substrates and the like, are subject to staining by a variety of agents, e.g., foods and beverages. Acid dyes are especially troublesome staining agents, e.g., FD&C Red Dye No. 40, which is commonly found in soft drink preparations. Prior proposals for inhibiting staining of polyamide substrates by acid dyes include application of sulfonated phenol-formaldehyde condensates, alone or in combination with hydrolyzed maleic anhydride polymers or polymers of methacrylic acid, acrylic acid, or itaconic acid, or combinations of the same.

WO Patent Application 92/10605 discloses the use of alpha-olefin/maleic anhydride copolymers as stain resists for polyamide textile substrates. The copolymers have between about 0.7 and 1.3 polymer units derived from the alpha-olefin per unit derived from maleic anhydride, the alpha-olefin content of said copolymer comprising between (a) 100 and 80 mol % of an 1-alkene containing 4 to 8 carbon atoms or a terminally unsaturated diene containing 4 to 18 carbon atoms and (b) 0 to 20 mol % of at least one 1-alkene containing 3 or 10 to 18 carbon atoms. An example in which butadiene was the alpha-olefin showed inferior performance for stain resistance relative to 1-alkenes.

U.S. Pat. Nos. 5,707,708 and 5,834,088 disclose the utility as stain resists on polyamide nylon or wool substrates of 1-alkene/maleic anhydride copolymers having between about 0.4 and 1.3 polymer units derived from the 1-alkene per unit derived from maleic anhydride, the 1-alkene content of said copolymer comprising between (a) 100 and 80 mol % of an 1-alkene containing 4 to 12 carbon atoms and (b) 0 to 20 mol % of at least one 1-alkene containing 3 or 14 to 24 carbon atoms. These patents further disclose that copolymers of maleic anhydride with ethylene, propylene, 1,4-butadiene and 1-alkenes having 14-24 carbon atoms were unsatisfactory for commercial purposes as stain resists on such substrates.

In other fields of research, there has been much interest in dendritic polymers or dendrimers. These are characterized by a well-defined tree-like architecture, the presence of a large density of groups on the surface, and by internal cavities, making them potentially useful in such applications as drug delivery systems, nanoscale building blocks, and electronic applications. Their manufacture requires many process steps and extensive purifications, making them too expensive for many applications.

A useful alternative to dendrimers is the class of hyperbranched polymers, which also have a dendritic structure but with a less controlled architecture, and which can be prepared by a carefully controlled one-pot polymerization. Liu et al., *Macromolecules* 34, 5067-5070 (2001), disclose a process for making a hyperbranched polymer using allyl ether and maleic anhydride.

New compositions capable of providing stain resistance are desirable. It is further desirable to have stain resistant compositions having reactive groups through which additional functionality can be introduced and/or provide mechanism to bond to a substrate surface. This invention meets these needs.

SUMMARY OF THE INVENTION

The present invention is directed to a hyperbranched polymer comprising polymer units derived from (a) maleic anhydride and (b) at least one terminally-unsaturated, acyclic aliphatic diene having at least 7 carbon atoms; wherein said polymer has at least one pendent olefinic group for each 10 polymer units. Optionally, the hyperbranched polymer may further comprise polymer units derived from at least one 1-alkene. Optionally, the hyperbranched polymer may comprise units derived from a chain transfer agent.

The present invention is further directed to a process to prepare a hyperbranched polymer comprising the steps of contacting maleic anhydride with at least one terminally-unsaturated acyclic aliphatic diene, and optionally, at least one 1-alkene, in the presence of an effective amount of a radical initiator, in an aprotic polar solvent under dilute conditions. Optionally, the maleic anhydride may also be contacted with a chain transfer agent.

The hyperbranched polymer of this invention may be used in a method to impart stain resistance to a substrate, wherein said method comprises applying to a substrate a stain resist composition comprising a hyperbranched polymer comprising polymer units derived from (a) maleic anhydride and (b) at least one terminally-unsaturated, acyclic aliphatic diene having at least 7 carbon atoms; wherein said polymer has at least one pendent olefinic group for each 10 polymer units. There is further provided a substrate treated with a composition comprising a hyperbranched polymer of this invention wherein the substrate is resistant to staining by acid dyes.

DETAILED DESCRIPTION OF THE INVENTION

Figure 1:
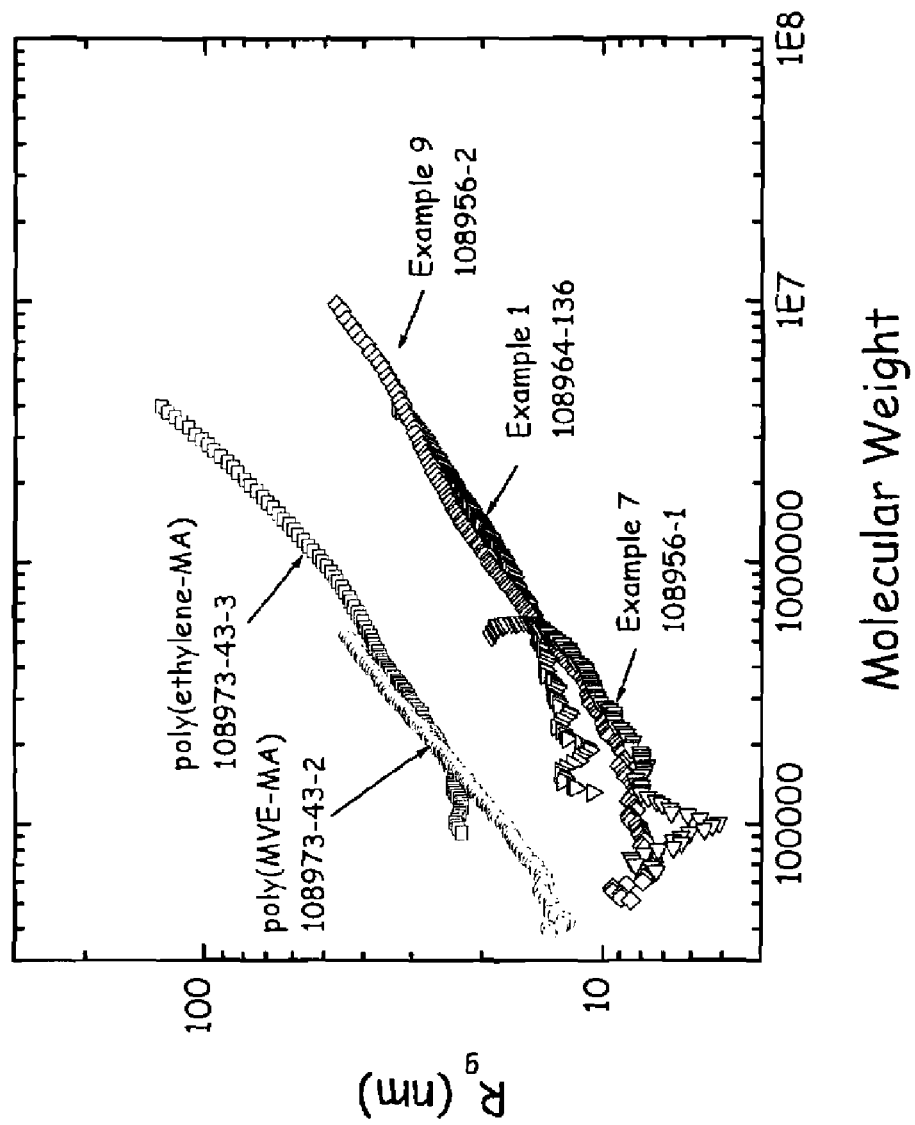
FIG. 1 is a graph of the root-mean-square radius of gyration, $R_g$, of polymers of the invention, prepared according to Examples 1, 7 and 9, and comparative (linear) polymers as a function of weight average molecular weight, M.

Trademarks and trade names used herein are shown in upper case.

It is known to those skilled in the art that polymers having the same chemical composition but having different branching may have different properties. See, for general background, F. W. Billmeyer, Textbook of Polymer Science, 3rd Ed., John Wiley and Sons, New York, 1984, chap. 8 and 11; P. J. Flory, Principles of Polymer Chemistry, Cornell University Press, 1953, chap. 7; and C. Tanford, Physical Chemistry of Macromolecules, John Wiley and Sons, New York, 1961, chap. 6 and 9.

Hyperbranched Polymer Composition

This invention relates to a novel hyperbranched polymer. This polymer is water-soluble and particularly useful in the treatment of textiles, such as fabrics, and carpets, as well as hard surfaces, such as stone and tile, to render them resistant to staining By "hyperbranched polymer" is meant a highly branched macromolecule synthesized from a multifunctional monomer or its precursor to produce a molecule in which the connections between the polymerized units are branched rather than linear. Hyperbranched polymers have polymer units packed close together and occupy a very small volume in solution relative to linear polymers, which are free to expand. These polymers are characterized by having (1) compact and generally globular shapes; (2) large numbers of reactive surface groups; and (3) low intrinsic viscosities relative to linear polymers of similar molecular weight.

The novel hyperbranched polymer of this invention is a copolymer having primary (monomer) components of maleic anhydride and at least one terminally-unsaturated aliphatic acyclic diene. The hyperbranched polymer has at least one pendent olefinic group for each 10 polymer units. The olefinic groups provide sites for further functionalization or bonding, e.g., to surfaces.

The diene (or dienes) has at least 7 carbon atoms. Typically, the diene has 14 carbon atoms or less, as these are readily available commercially, although dienes having 15 carbon atoms or more are contemplated herein. The diene may have one terminal and one internal double bond. Preferred are dienes having two terminal double bonds and are selected from the group consisting of 1,7-octadiene, 1,9-decadiene, 1,11-dodecadiene, 1,13-tetradecadiene and mixtures of two or more thereof. Most preferred diene is 1,7-octadiene due to cost and availability. For purposes herein, a terminally-unsaturated aliphatic acyclic diene is a compound having at least two carbon-carbon double bonds. Thus, included within the scope of "diene" is triene, which has three carbon-carbon double bonds, such as 1,3,7-octatriene, and other polyenes, that is compounds having more than three carbon-carbon double bonds.

Optionally, at least one 1-alkene may be added as third monomer. Preferred are 1-alkenes having 4 to 18 carbon atoms. Examples of suitable 1-alkenes include 1-octene, 1-hexene, 1-decene, 1-dodecene, and mixtures of two or more thereof. A preferred 1-alkene for this invention is 1-octene.

While the diene and optional 1-alkene are typically hydrocarbon molecules, certain functional groups can be tolerated in one or both of the diene and 1-alkene so long as the functional group does not adversely affect the formation of the structure of the hyperbranched polymer. Suitable functional groups, which may be present in the diene and optional 1-alkene include keto, sulfido, cyano, halo, alkoxy, amino, amido, carboxylato, and nitro. For purposes of this invention, halo means chloro, bromo, and/or iodo. Also for purposes of this invention, alkoxy is OR wherein R is an alkyl group.

The hyperbranched polymer has a molar ratio of diene-derived polymer units to maleic anhydride-derived polymer units of between 0.4:1 and 0.6:1. The polymer of this invention has this ratio over a range of relative concentrations of diene and maleic anhydride in a reaction mixture. For example, the molar ratio of diene to maleic anhydride in the reaction mixture may be 1:1 and the molar ratio of diene-derived units to maleic anhydride-derived units in the polymer product may be 0.5:1. Conveniently, when an excess of diene is added to the reaction mixture, unreacted diene may be recovered from the reaction mixture and reused.

The hyperbranched polymer of this invention may further comprise units derived from a chain transfer agent. A chain transfer agent may be added for the purpose of limiting the molecular weight of the polymer. Examples of suitable chain transfer agents include acetic acid, acetone, n-butyl alcohol, chloroform, di-n-butyl disulfide, carbon tetrachloride, carbon tetrabromide, triethylamine, n-butyl mercaptan, dodecylmercaptan. Preferably, when a chain transfer agent is used, the chain transfer agent is dodecylmercaptan.

The hyperbranched polymer of this invention may have a molecular weight of at least 1000. The hyperbranched polymer may have a molecular weight of 1,000,000 or less. The hyperbranched polymer may have a molecular weight greater than 1,000,000.

The hyperbranched polymers of this invention may be hydrolyzed according to methods well-known in the art for end use applications. For example, they may be hydrolyzed to the free acid or the corresponding salt by reaction with water or aqueous alkali.

The hyperbranched polymer of this invention is compact and generally has a globular shape. The polymer has a size parameter, $R_g$ and intrinsic viscosity, $[\eta]$, which are coupled to particular molecular weight parameters to distinguish them as densely branched. Both $R_g$ and $[\eta]$ are measures of the effective size of the polymer molecule in solution. $R_g$ is the average radius of gyration, measured in nanometers (nm). $R_g$ is a measure of the radius of the spherical volume the polymer molecule occupies in solution. Intrinsic viscosity, $[\eta]$, is measured in milliliters per gram (mL/g). $[\eta]$ may be considered a measure of the volume a unit mass of polymer occupies in solution. The $R_g$ and $[\eta]$ of a hyperbranched polymer of this invention are low relative to linear polymers of similar molecular weights.

$R_g$ and $[\eta]$ are both functions of the molecular weight, M, of a polymer. Equations (1) and (2) show the relationships of M with $R_g$ and $[\eta]$, respectively:

$$R_g = A \times M^B \tag{1}$$

$$[\eta] = K \times M^\alpha \tag{2}$$

K and $\alpha$ are known as the Mark-Houwink coefficients. A and B are coefficients relating $R_g$ to M.

$R_g$ and $[\eta]$ are related by:

$$[\eta] = \phi'\{R_g^3/M\} \tag{3}$$

where $\phi'$ is a constant.

The exponents "$\alpha$" and "B" provide evidence of the hyperbranched structure of the polymers of this invention. These exponents have a minimal value of 0.5 for linear polymers in poor solvents and are expected to be around 0.6-0.7 for linear polymers in good solvents as is recognized by those skilled in the art. Polymers with linear backbones but with substantial comb-like branches can have greatly reduced values of $R_g$ and $[\eta]$, but the exponents "$\alpha$" and "B" will still be above 0.5 due to the linear backbone. Values of "$\alpha$" and "B" less than 0.5 provide definitive evidence of a densely branched, globular structure. At very high densities of branches, these properties approach those of particles, with "$\alpha$" approaching zero, and "B" approaching ⅓. This comes from expectations for a solid sphere—the limit of dense and globular for a structure. A sphere has $[\eta]$ independent of size ($\alpha$~0) and radius which scales with mass to ⅓. Thus, the ranges of $\alpha$ and B for the polymers of this invention are $0 < \alpha < 0.5$ and $⅓ < B < 0.5$.

The greatly reduced volume occupied in solution is also reflected in the absolute viscosity in dilute and concentrated solutions, which is much lower for the hyperbranched polymers of this invention than for linear polymers of similar molecular weight. Thus, the hyperbranched polymer also provides a lower viscosity, permitting higher solids loading for coating purposes.

The hyperbranched polymer of this invention has a much higher proportion of endgroups than comparable linear polymers, which may facilitate linking the hyperbranched polymer to a substrate surface and/or permit functionalization of a coating derived from the hyperbranched polymer on the substrate surface.

$R_g$ (as measured by light scattering) for the hyperbranched polymer of this invention may be greater than 10 nm, even greater than 40 nm. For hyperbranched polymers of this invention having molecular weight above 10,000,000, $R_g$ may be greater than 100 nm.

Generally, the following describes hyperbranched polymers of this invention, wherein M is weight average molecular weight.

| M | [η], mL/g (typical range) | [η], mL/g (preferred) |
|---|---|---|
| 10,000 | 1-10 | 3-6 |
| 100,000 | 2-40 | 7-15 |
| 1,000,000 | 6-100 | 12-60 |
| M | $R_g$, nm (typical range) | $R_g$, nm (preferred) |
| 100,000 | Less than 10 | Less than 8 |
| 1,000,000 | Less than 35 | Less than 25 |

The methods used for determination of molecular weight, [η] and $R_g$ over a range of molecular weights are described hereinbelow.

Polymerization Process

The present invention further provides a process to prepare the hyperbranched polymer of this invention which comprises contacting maleic anhydride with at least one terminally-unsaturated acyclic aliphatic diene having at least 7 carbon atoms, and optionally, at least one 1-alkene, in the presence of an effective amount of a radical initiator, in an aprotic polar solvent under dilute conditions.

The terminally-unsaturated acyclic aliphatic dienes are those as described hereinabove, having at least 7 carbon atoms with those having no more than 14 carbon atoms are preferred. Preferred 1-alkenes have 4 to 18 carbon atoms.

The formation of a hyperbranched polymer usually requires predominantly alternate polymerization, or a gel would form due to difunctional diene cross-linking. The hyperbranched polymers of this invention can be produced by a "self-condensing vinyl polymerization" process similar to that described by Frechet, et al., *Science*, 269, 1080 (1995), incorporated herein by reference.

The molar ratio of diene to maleic anhydride in the process can vary. However, typically the molar ratio is generally in the range of 0.5:1 to 3:1, preferably at least 1:1, and more preferably 1:1 to 1.5:1. It has been found that a significant percent of the terminally-unsaturated diene may remain unreacted under the process conditions regardless of the molar ratio of diene to maleic anhydride. Therefore, the final polymer ratio of diene to maleic anhydride may be lower than the initial ratio. For example, in Example 1, 1,7-octadiene and the maleic anhydride are contacted at a molar ratio of diene to maleic anhydride of 1:1. The polymer product has a molar ratio of 0.5:1 of 1,7-octadiene : maleic anhydride. Conveniently, the process may further comprise recovering unreacted diene, such as during solvent removal or other steps in the purification of the hyperbranched polymer product. Recovered diene may be reused in future preparations of hyperbranched polymers or for other uses.

When an optional 1-alkene is present as a comonomer, the molar ratio of 1-alkene to maleic anhydride is generally from about 0 to about 0.9:1, preferably, from about 0.1 to about 0.8, and more preferably from about 0.2 to 0.6.

The process of this invention for the preparation of the above hyperbranched polymer is carried out in an aprotic polar solvent. Suitable solvents include ketones, ethers, anhydrides, alcohols, and nitriles. A preferred solvent is selected from the group consisting of acetone, methylisobutylketone (MIBK), and tetrahydrofuran.

The process of this invention for the preparation of the above hyperbranched polymer is carried out under dilute conditions. By "dilute conditions" it is meant total concentration of reacting monomers, that is maleic anhydride and diene, and optional 1-alkene, if present, is less than 50% by weight based on the weight of the solvent, preferably less than 30% by weight of the solvent, and more preferably less than 20% by weight of the solvent. The concentration of reacting monomers in the solvent is also generally at least 5% by weight of the solvent.

The process of this invention is performed in the presence of a radical initiator. Suitable radical initiators include organic peroxides and azo compounds.

Examples of particularly useful radical initiators are benzoyl peroxide, and azodiisobutylronitrile. Others useful radical initiators are t-butyl peroxide, acetyl peroxide, and lauryl peroxide.

The radical initiator is generally added over a period of time after the reaction monomers have dissolved in the solvent and/or after the reaction mixture is at the desired temperature. The radical initiator is added in an effective amount. By an "effective amount" of a radical initiator is meant an amount sufficient to initiate the reaction between the monomers and preferably to sustain the reaction for a sufficient period of time to maximize yield of the polymer product. An effective amount of initiator will vary with the exact composition and reaction conditions used. An effective amount of initiator for a given set of conditions is easily determined experimentally by one skilled in the art.

The concentration of radical initiator is generally from 1% to 5% by weight, preferably 2% to 4%, based on the weight of the solvent. This concentration of initiator may be higher than what is typical for a linear radical polymerization reaction. In this process, the initiator becomes incorporated into the hyperbranched polymer.

The process may further comprise adding a chain transfer agent while contacting the maleic anhydride with the diene and optional 1-alkene in the presence of the initiator. Typical chain transfer agents are described above. A chain transfer agent is generally added in an amount of 0.10% to 1.0% by weight, based on the weight of the solvent.

The polymerization process of this invention is generally performed by contacting maleic anhydride with a diene as described above, and optionally, a 1-alkene, in the presence of a radical initiator in a solvent in a vessel to provide a reaction mixture. The vessel is typically equipped for agitation and heating and may also be equipped with a condenser and a nitrogen purge. The reaction mixture may be stirred at room temperature until all solids are dissolved. The reaction mixture may then be heated to desired reaction temperature and is optionally purged with nitrogen or other inert gas. Generally, the radical initiator is not added until the other reagents reach the desired reaction temperature. Reaction temperature typically is from about 40° C. to about 80° C., preferably, 50° C. to 70° C., and more preferably, about 50° C. to 60° C. However, temperature will depend on the monomers. For certain combinations of monomers, the higher temperatures, e.g., 70-80° C., may not be suitable to produce the hyperbranched polymers of this invention. Appropriate temperatures within this range may be readily determined by those skilled in the art.

After addition of the radical initiator, the solution is generally held at reaction temperature until the reaction is complete. The reaction is considered to be complete when all of the maleic anhydride has been consumed. If desired, consumption of maleic anhydride may be determined by monitoring the disappearance of maleic anhydride, for example, by gas chromatography. At the end of the reaction a substantial portion of the olefin (diene and optional 1-alkene, if added) may remain unreacted in the reaction mixture.

The process may further comprise recovering and purifying the hyperbranched polymer product from the reaction mixture. Recovering the polymer may comprise cooling the reaction mixture to ambient temperature and/or removing all or a portion of the solvent under vacuum. Recovering the polymer may comprise combining the reaction mixture, or mixture remaining after removal of all or a portion of the solvent, with a nonpolar solvent such as hexane, toluene or a mixture thereof, to precipitate the hyperbranched polymer as a solid mass. The process may further comprise filtering and washing the precipitated polymer with a nonpolar solvent such as hexane, toluene or a mixture of these. The process may further comprise drying the solid polymer. Yields greater than 90% of theory can readily be achieved and are typical.

The final yield of hyperbranched diene-maleic anhydride polymer may depend not only on the initial ratio of diene to maleic anhydride prior to polymerization but also a number of other process factors such as the concentration of monomers in the solvent, the amount of initiator used, and the temperature for the polymerization. It is recognized that many variations to the above process are acceptable and will be evident to those skilled in the art.

Industrial Applications

The hyperbranched polymers of this invention are suitable for a number of end use applications. For example, the polymers may be used for treating substrates to provide stain resistance. Additional uses of the hyperbranched polymers of this invention include, but are not limited to, use in nanomaterials for host-guest encapsulation, the fabrication of organic-inorganic hybrids, biomaterials, self-assembly films and layers patterning of hyperbranched polymer films, and for gas and solution separation. In addition, the hyperbranched polymers may be used in liquid crystals, delivery devices, blend components, additives, coatings, multifunctional cross-linkers, nanofoams in low dielectric materials, sensors, catalysts, soluble functional supports. Coating examples include powder coatings, high solids coatings, and in low VOC (volatile organic chemical) coatings.

The present invention is further directed to a stain resist composition comprising the hyperbranched polymer of this invention or its hydrolyzed product and to a method of providing stain resistance to a substrate which comprising applying to the substrate the stain resist composition. The stain resist composition generally comprises the hydrolyzed polymer. The polymer is hydrolyzed by methods known to those skilled in the art prior to applying to a substrate.

The stain resist composition comprising the hyperbranched polymer of this invention or the corresponding hydrolyzed polymer may further comprise other known stain resists, such as phenol-formaldehyde condensation products, or hydrolyzed polymers of maleic anhydride and at least one ethylenically unsaturated aromatic compound. The composition may also comprise one or more surfactants.

The stain resist composition preferably comprises water, an organic solvent, or a mixture of water and an organic solvent, and is generally in the form of a solution or dispersion. Use of an organic solvent may improve penetration, drying and the stability of the dispersion. Generally, the method of applying a stain resist composition to a substrate comprises hydrolyzing the hyperbranched polymer prior to applying the composition to the substrate. The hyperbranched polymer or its hydrolyzed product is sufficiently soluble in the solution or suspended in the dispersion that uniform application to a substrate may be achieved at an appropriate pH.

Organic solvents such as low molecular weight alcohols (methanol, ethanol) or ketones (acetone, MIBK), or esters (isopropyllactate) may be used.

Thus, the stain resist composition may comprise water, organic solvent, or a combination thereof. The organic solvent is preferably present up to an amount of about 10% by weight of the total weight of the solution or dispersion, and preferably not more than 3% by weight of the total weight of the solution or dispersion. It is generally desirable to minimize organic solvent for health, safety, pollution, and ecological reasons.

The stain resist composition of this invention may be produced by a process comprising hydrolyzing the hyperbranched polymer in an aqueous solution comprising alkali metal hydroxide or ammonium hydroxide to form a dispersion or solution.

In one embodiment of the method of this invention to provide stain resistance to a substrate, the substrate is a textile substrate. The method for applying the stain resist composition to textile substrates may be by spray, brush, dip, foam, flex-nip, pad, kiss-roll, beck, skein, or winch. The method may alternatively comprise applying the stain resist composition by use of the conventional beck dyeing procedure, continuous dyeing procedure or thread-line application. When applied to textile substrates, the stain resist composition may further comprise, or be applied to a substrate of this invention in combination with, other textile finishes, processing aids, foaming agents, lubricants, anti-soils, and the like. The preferred textile substrate is a carpet. The composition may be applied to a carpet at a carpet mill, at a retail facility, or at the carpet installation site. The treated textile substrate has enhanced stain resist properties.

The stain resist composition of this invention may be applied to dyed or undyed textile substrates. The composition may be applied to textile substrates in the absence or presence of fluorinated oil-, water-, and /or soil-repellent materials. Alternatively, fluorinated materials may be applied to the textile substrate before or after application of the stain resist composition.

In an alternative embodiment of the method of this invention to provide stain resistance to a substrate, the substrate is a hard surface. The method for applying the stain resist composition to hard substrates may be by conventional means, including but not limited to, brush, spray, roller, doctor blade, wipe, immersion, and dip techniques. Preferably a first coating is followed by at least one additional coat using a "wet-on-wet" technique. More porous substrates may require subsequent additional coats. The wet-on-wet technique comprises applying a first coat of the stain resist composition, which is allowed to soak into the substrate but not dry (e.g., for about 10-30 minutes) and then applying a second coat of the composition. Subsequent coats of the composition are applied using the same technique, that is applying subsequent coats prior to drying of the previous coat. The substrate surface is then dried under ambient conditions, or drying may be accelerated by warm air, if desired. The wet-on-wet technique provides a means to distribute or build up more of the protective coating at the substrate surface. A wet-on-wet technique is preferred since, if the previous coat is allowed to dry, it tends to repel subsequent coats. For porous substrates, the coats should saturate the substrate surface.

The present invention is further directed to a substrate to which a stain resist composition comprising the hyperbranched polymer of this invention or its hydrolyzed product has been applied. Suitable textile substrates are films, fibers, yarns, fabrics, leather, carpet, and other articles made from filaments, fibers or yarns derived from natural, modified natural, or synthetic polymeric materials or from blends of these other fibrous materials. Specific representative examples are cotton, wool, silk, polyamides, including nylon 6, nylon 6,6 and aromatic polyamides, polyaramids, acrylics, polyesters including poly(ethyleneterephthalate) and poly(trimethyleneterephthalate) (abbreviated PET and PTT, respectively), poly(acrylonitrile), polyolefins, jute, sisal and other cellulosics, and blends thereof.

Hard surface substrates include porous mineral surfaces and various other substrates with surface porosity. Specific examples of such substrates include stone(including granite and limestone), masonry, concrete (including unglazed concrete), tile (including unglazed tile), brick, porous clay, grout, mortar, marble, limestone, statuary, monuments, wood composite materials (including terrazzo), gypsum board (including that used in wall and ceiling panels). The treated substrates may be used in the construction of buildings, roads, parking ramps, driveways, floorings, fireplaces, fireplace hearths, counter tops, and other decorative uses in interior and exterior applications.

Application of the stain resist composition to textile or hard surface substrates imparts stain resistance and/or oil-, water-, and stain-repellency properties to the substrates. Of particular interest in accordance with this invention is carpet, especially polyamide (nylon) carpet, to which the stain resist composition has been applied.

EXAMPLES

Analytical Methods for Characterization of Hyperbranched Polymers

The following abbreviations are used in this section:

SEC—size exclusion chromatography
(same as gel permeation chromatography, GPC)
$M_i$—molecular weight of polymer i
$M_n$—number average molecular weight
$M_w$—weight average molecular weight
$[\eta]$—intrinsic viscosity
$R_g$—the root-mean-square radius of gyration from light scattering The hyperbranched polymers of this invention are prepared by polymerization of maleic anhydride with a variety of terminally-unsaturated hydrocarbons as described above. Determinations of molecular weights ($M_i$, $M_n$, and $M_w$), the root-mean-square radius of gyration ($R_g$) and the intrinsic viscosity ($[\eta]$), were accomplished using size exclusion chromatography coupled with multi-angle light scattering and differential viscometry (SEC/MALS/Viscometry).

A Waters Alliance 2690 chromatography system (Waters Corp., 34 Maple St., Milford, Mass. 01757 U.S.A.) in PBS buffer (phosphate buffered saline), 0.5 ml/min flow, a Waters R410 differential refractometer (Waters Corp.), at sensitivity=8, a Viscotek Model T80 differential viscometer (Viscotek Corporation, 15600 West Hardy Rd, Houston, Tex. 77060, U.S.A.) and a Wyatt Technology Dawn DSP Multi-angle light scattering detector (Wyatt Technology Corp., 30 S. La Patera Ln., B-7, Santa Barbara, Calif. 93117 U.S.A.), using 632.8 nm light were used. Wyatt Technology ASTRA® for Windows® software (Wyatt Technology Corp.) was used to collect and analyze data. SEC columns used were Tosoh Bioscience (Tosoh Bioscience, 156 Keystone Dr, Montgomeryville, Pa. 18936 U.S.A.) TSK-Gel PW (3000 and 4000) or Tosoh Bioscience TSK Alpha columns (Mixed Gel). Polymer (0.1-0.3 mg) was injected in 200 μl of solution. The column temperature was 40° C., and the R410 differential refractometer temperature was 40° C.

Light scattering intensity at 18 scattering angles was recorded as the polymer solution eluted from a size exclusion chromatograph. Concentration was monitored using a differential refractometer. The relative viscosity was also monitored using a differential viscometer. $M_i$ and $R_g$ were evaluated at selected points of the distribution using the well-established expressions for classical light scattering per equation (4).

$$Kc/R\Theta = 1/M_i \{1 + 16 \pi^2 n^2 R_g^2 \sin^2(\Theta/2)/3 \lambda^2\} \quad (4)$$

where
$R\Theta$ is the Rayleigh ratio at scattering angle $\Theta$, obtained from the scattering intensity per equation (5).

$$K = \frac{4\pi^2 n^2 (dn/dc)^2}{\lambda^4 N_A,} \quad (5)$$

where
n is the refractive index of the solvent, 1.33 for water,
$\lambda$ is the wavelength of the incident light, 632.8 nm,
$N_A$ is Avogadro's number, and
dn/dc is the refractive index increment, 0.180 for octadiene-derived polymers in water.

The concentration, c, was determined either by weight or by the calibration of the differential refractometer using the dn/dc given above. The concentrations of polymer eluting from the chromatograph column were sufficiently small that the concentration dependence could be neglected.

The intrinsic viscosities, $[\eta]$, were determined from the ratio of the differential viscometer response to the concentration. The differential viscometer was calibrated with a series of water soluble polymer standards of known intrinsic viscosities, polyethylene oxides and dextrans. For determination of $[\eta]$, the concentrations of polymer eluting from the chromatograph column were sufficiently small that the concentration dependence could be neglected.

$R_g$ as a function of $M_i$ was obtained for each polymer over the range of molecular weights encompassed by the polymer sample. The intrinsic viscosity, $[\eta]$, as a function of $M_i$ was also obtained for each polymer across the molecular weight distribution. The data for each polymer were fitted by the expected relations for $R_g$ and $[\eta]$, respectively:

$$R_g = A * M_i^B \quad (6)$$

with $R_g$ in nm $$[\eta] = K * M_i^\alpha \quad (7)$$

with $[\eta]$ in ml/g. These are tabulated below for several hyperbranched polymers according to the Examples as specified and for two comparison polymers having a linear structure.

For each entry in Tables 2 and 3, the parameters extracted from the linear least-squares fit to Equations (6) and (7) are listed, as well as the averages $M_w$, the polydispersity, $M_w/M_N$, the average intrinsic viscosity, $[\eta]$, and the average radius of gyration, $R_g$.

Stain Test Methods

The carpet material used in these tests was composed of nylon 6,6 and was a commercial level loop (LL) 1245 denier, 1/10 gauge (0.1 inch or 2.5 mm tuft separation), 26 oz/yd$^2$ (0.88 kg/m$^2$) carpet, dyed pale yellow and available from Invista Inc., Wilmington Del.

Coffee Stain Test

Carpet samples, 6.76×6.76-inch (17.2×17.2 cm) squares of dyed carpet, were cut and placed pile side up on a non-absorbent surface. The pile was cleaned of any unattached materials by vacuuming. ORIGINAL MAXWELL HOUSE ground coffee (33.8 g), available from Maxwell House Coffee Co., Tarrytown N.Y. was placed into a standard 10-cup coffee filter. Deionized water (1266.2 g) was added and the coffee brewed according to the manufacturers' directions. The pH of the coffee was adjusted to 5.0 using aqueous solutions containing either 30% aqueous sodium hydrogen sulfate or 10% sodium hydroxide as needed. The coffee was poured into a suitable volumetric dispenser, capable of dispensing 50 mL portions and the dispenser placed in the hot water bath at 62° C. The coffee was allowed to come to a temperature 140° F.±5° F. (60°±2.8° C.) and remain at that temperature for 30±5 minutes prior to staining A ring, in the shape of an open-ended cylinder was used, having a diameter of the smaller opening of 2.75 inch (7 cm). Such a ring is described for a different purpose in AATCC Test Method 175. The ring was placed at the center of the carpet sample, with the smaller diameter opening against the pile. The coffee dispenser was set to measure 50 mL, and purged once prior to staining With the ring pressed down into the pile, 50 mL of coffee was transferred into a container and immediately poured into the ring and onto the carpet. The coffee was worked into the carpet evenly and thoroughly with the base of the cup. The coffee was allowed to stain the carpet for 4 hours±20 minutes. Then the carpet samples were thoroughly rinsed in cold water for at least 10 minutes until the rinse water was clear. The carpet samples were extracted using vacuum and air-dried for 24 hours on a non-absorbent surface. The coffee stains obtained by this procedure were rated using a delta E color difference measurement.

For color measurement with delta E color difference, the color of each control and test carpet was measured both before and after the coffee stain test.

The initial color of the carpet (L*, a*, b*) was measured on an unstained piece of carpet. The delta E is the difference between the color of the unstained and stained samples, expressed as a positive number. The color difference was measured using a Minolta Chroma Meter CR-410. Color readings were taken on several areas on the carpet sample, and the average delta E was reported. Control carpets were of the same color and construction as the carpets for test items. A delta E reading of zero represents no color difference between two samples. A larger delta E value indicates a color difference between two samples. Color measurement with delta E is discussed in AATCC Evaluation Procedure 7 "Instrumental Assessment of the Change in Color of a Test Specimen".

The colorimetric delta E values from the coffee stain resist test on a sample and control was used to calculate the "Percent Coffee Blocked". Higher values denote better stain blocking. The percent blocking of the stain is calculated as:

$$100(\text{Delta } E_{untreated} - \text{Delta } E_{treated})/\text{Delta } E_{untreated}.$$

Stain Tests with Cherry KOOL-AID

Acid dye stain resistance was evaluated using a procedure based on the American Association of Textile Chemists and Colorists (AATCC) Method 175, "Stain Resistance: Pile Floor Coverings." One hexagon and one square shape specimen (6"×6") were cut from the center of each carpet sample to be tested. Octagonal-shaped specimens denoted the "24 hour KOOL AID Stain Test"; square-shaped specimens denoted the "24 hour WAQE Stain Test".

24 Hour KOOL AID Stain Test (24 Hour KA)

Cherry flavored sugar pre-sweetened KOOL-AID was used as the staining agent. 45 g of KOOL-AID was added to 500 mL of room temperature tap water (8.3 wt %) to provide the KOOL-AID staining solution. KOOL-AID IS a trademark of Kraft General Foods, Inc.

The octagonal samples were placed on a flat nonabsorbent surface and a hollow plastic cylinder having a 2-inch (5-cm) diameter was placed tightly over the carpet sample. 20 mL of KOOL-AID staining solution were poured on each carpet sample through the cylinder to form a circular stain. The solution was gently tapped into tufts for uniform staining, and then the cylinder was removed. The carpet was left undisturbed for 24±4 hours. Cool tap water was used to rinse the samples thoroughly, squeezed dry, and then extracted to remove excess solution so the samples were dry to the touch.

The samples were evaluated visually at the center of the stain for any staining A visual rating of 10 (complete stain removal) to 1 (maximum or unchanged stain) was obtained by using the AATCC Red 40 Stain Scale (Test Method 175) with the stain having the same discoloration as the numbered colored film. The specimens were viewed under maximum available cool white fluorescent light. At eye level, the scale was held by the specimen at a 45-degree angle with the ground. Higher values represent superior stain resistance.

24 Hour WAQE Stain Test (24 Hour WAQE)

Approximately 2.0 oz. (57 mL) of DUPONOL WAQE, a sodium alkane sulfonate detergent, available from Witco Corporation, Greenwich, Conn., were added to one gallon of water (equal to 15 g/L) and the pH was adjusted to 10.0±0.2 with trisodium phosphate (TSP). The solution was allowed to reach room temperature (24±3° C.) before using.

The square samples were completely and simultaneously immersed in the DUPONOL WAQE detergent solution for 5 minutes. Samples were removed from the solution, promptly rinsed under a faucet until no more suds were visible, and then extracted to remove all excess water. The samples were dried overnight. The detergent solution was discarded after each wash cycle.

The square samples were placed on a flat nonabsorbent surface and a hollow plastic cylinder having a 2-inch (5-cm) diameter was placed tightly over the carpet sample and treated with 20 mL of KOOL-AID staining solution, as described above for the 24 hour KOOL AID Stain Test The samples were evaluated visually at the center of the stain for any staining as described above.

Example 1

This Example shows the polymerization of 1,7-octadiene with maleic anhydride. 1,7-octadiene (88.0 g, 0.80 mol), maleic anhydride (78.4 g, 0.80 mol), and acetone (800 g) were added to a 2 liter round bottom flask with overhead stirring, a condenser with a 0° C. refrigerant, a thermocouple temperature measurement, a nitrogen purge, a solid dropping funnel, and a heating mantle. The solution was stirred at room temperature until all the solids had dissolved.

The solution was then heated to 50° C. and the solution was purged subsurface with nitrogen for one hour. Benzoyl peroxide (29.2 g, 0.12 mol) was then added as a solid over a 0.5 hour time period. The solution was held at 50° C. for 48 hours. The reaction was monitored with gas chromatography by following the disappearance of the 1,7-octadiene and maleic anhydride monomers. At the end of the reaction about 50% of the 1,7-octadiene remained while the maleic anhydride was consumed. The solution was then allowed to cool to room temperature. The solution was a clear brown color at this point. Part of the solution (~600 g) was then removed under vacuum. The remaining acetone solution was poured into a stirred 1:1 toluene:hexane mixture (2 liter). A grey solid precipitated which was filtered. The solid was then washed with toluene (3 washes of 400 ml each) and hexane (3 washes of 400 ml each). The solid was dried in an 80° C. oven (132 g was isolated).

The consumption of 50% of the octadiene compared to 100% of the maleic anhydride indicated that the polymer product contained between about 0.4 and 0.6 polymer units derived from the terminally-unsaturated diene monomer per polymer unit derived from maleic anhydride. This was confirmed by a number of characterization tests, described hereinabove and hereinbelow.

The characterization of the polymers was done with a combination of Fourier Transform Infrared Spectroscopy (FTIR), Proton ($^1$H) NMR and Carbon-13 ($^{13}$C) NMR spectroscopies, molecular weight, and intrinsic viscosities, as detailed hereinabove. The FTIR showed a band at 1630 cm$^{-1}$ due to the vinyl unsaturation. The $^1$H NMR was performed routinely to determine the ratio of vinyl to saturated octyl protons and a 0.5:1 octadiene:maleic anhydride molar ratio was assumed. Overlap in the saturated alkyl region of the $^1$H NMR prevented the determination of the absolute ratio of the maleic anhydride to the octadiene. The $^{13}$C NMR was performed in selected cases to confirm the 0.5:1 octadiene:maleic anhydride molar ratios with an absolute value.

The $^1$H NMR showed resonances at 7.2-8.2 ppm (phenyl protons due to benzoyl peroxide fragments, or 5 mole %), vinyl protons (5.0 and 6.9 ppm in a 2:1 ratio, 16 mole %), and maleic anhydride and saturated octyl backbone (3.1-3.6 ppm, or 67 mole % maleic anhydride and 12 mole % saturated octyl branches). The $^{13}$C NMR showed maleic anhydride (64 mole %), unsaturated olefin of 1,7-octadiene (17 mole %), saturated branching of octyl (14 mole %), and benzoyl peroxide initiator (5 mole %). The error between the $^{13}$C NMR and $^1$H NMR analyses is acceptable for a polymer in solution and serves as a check. Further characterization is presented in Tables 2 and 3 and in FIGS. 1 and 2 and discussed below.

Examples 2-3

The following Examples were performed under the same conditions as Example 1 except they were performed at 0.25 the scale of Example 1 and the amount of initiator was varied. These Examples are based on 22.0 g (0.20 mol) of 1,7-octadiene, 19.6 g (0.20 mol) of maleic anhydride, and 200 g acetone in a 500 ml round bottomed flask. These Examples demonstrate that the yield decreases with decreasing amount of benzoyl peroxide relative to the monomers. That is, for Examples 2 and 3, using same relative amounts of diene and maleic anhydride, polymer yield was much higher with a higher loading of benzoyl peroxide initiator. Results are summarized in Table 1.

TABLE 1

| Initiator Amount vs. Yield | | |
|---|---|---|
| Example | Benzoyl Peroxide (g, mol) | Isolated Yield (g) |
| 2 | 2.4 g, 0.01 mol | 13.1 |
| 3 | 0.80 g, 0.003 mol | 6.0 |

Example 4

This Example shows the effect of a lower diene to maleic anhydride molar ratio. 1,7-octadiene (11.0 g, 0.10 mol), maleic anhydride (19.6 g, 0.20 mol), and acetone (200 g) was added to the same reactor as in Examples 2-3 and done under identical conditions. The reaction was heated to 50° C. and the acetone solution was purged subsurface with nitrogen for one hour. Benzoyl peroxide (7.3 g, 0.03 mol) was then added to the solution over a 30 minute time period. The reaction was heated for 20 hours at 50° C. The yield of desired copolymer product was 11.2 g. The $^1$H NMR results were 8 mole % phenyl from initiator, 19% vinyl and 14% saturated 1,7-octadiene. The $^{13}$C NMR showed maleic anhydride (63 mole %), unsaturated olefins of 1,7-octadiene (18 mole %), saturated branching of octyl (12 mole %), and initiator fragments (7 mole %). Further characterization is presented in Table 2 and in FIG. 3 and discussed below.

This Example demonstrates that the yield decreases with lower diene:maleic anhydride molar ratio. That is, despite higher loading of benzoyl peroxide initiator than in Example 2, yield was lower in Example 4, in which a lower diene:maleic anhydride molar ratio was used.

Example 5

This Example shows the effect of lower diene to maleic anhydride ratio and a higher concentration of initiator. Example 4 was repeated except the amount of benzoyl peroxide was 14.6 g (0.06 mol). The yield of the copolymer product was 20.1 g. The $^1$H NMR results were 16.3 mole % phenyl from benzoyl peroxide, 18% vinyl and 16% saturated from 1,7-octadiene. The FTIR showed an absorption at 1630 cm$^{-1}$ due to the vinyl unsaturation.

This Example demonstrates that the yield increases with increasing amount of initiator. Yield in Example 5 was greater than yields in Examples 2 and 4, illustrating that by increasing the amount of initiator the disadvantage of lower diene:maleic anhydride molar ratio can be overcome.

Example 6

Example 4 was repeated, increasing the amount of diene. 1,7-octadiene (44.0 g, 0.20 mol) was used. 32.6 g polymer was isolated.

This Example demonstrates that higher diene:maleic anhydride ratio will increase yield.

Example 7

This Example shows use of an alternative solvent. Example 1 was repeated at 0.25 scale except tetrahydrofuran at reflux (65° C.) was used rather than acetone. The yield of desired copolymer product was 30.1 g (compared to 33 g for Example 1 at 0.25 scale). Further characterization is presented in Tables 2 and 3 and in FIGS. 1 and 2 and discussed below.

This Example demonstrates that other polar solvents can also be used effectively.

Example 8

This Example shows use of an azo initiator. Example 4 was repeated except 1,7-octadiene (22.0 g, 0.20 mol) was used, the solution was heated to 60° C., and the initiator was VAZO 64, available from E. I. du Pont de Nemours and Company, Wilmington, Del., (3.0 g) instead of benzoyl peroxide. The yield of desired copolymer product was 24.8 g.

This Example demonstrates that other initiators can be used to give good polymer yields.

Example 9

This Example shows the use of an alpha-mono-olefin as comonomer. 1,7-octadiene (11.0 g, 0.10 mol), 1-octene (23.0 g, 0.20 mol), maleic anhydride (39.2 g, 0.40 mol), and methyl isobutyl ketone (200 g) were added to a 500 ml round bottom flask with overhead stirring, a condenser with a 0° C. refrigerant, a thermocouple temperature measurement, nitrogen purge, a solid dropping funnel, and a heating mantle. The solution was stirred at room temperature until dissolved. The solution was heated to 75° C. and the solution purged subsurface with nitrogen for one hour. Benzoyl peroxide (7.3 g, 0.03 mol) was then added as a solid over a 20 minute period. The solution was held at 75° C. for 20 hours. The solution was clear and amber when it was cooled to room temperature. Methyl isobutyl ketone (160 g) was removed under vacuum. The remaining solution was poured into 600 ml of a stirred 1:1 hexane:toluene mixture. A white precipitate formed which was filtered and dried at 65° C. in a vacuum oven. 53.5 g of solid polymer was isolated.

The reaction was monitored by following the disappearance of the 1-octene, 1,7-octadiene, and maleic anhydride by gas chromatography. The percent incorporation of the monomers into the polymer was calculated by calculating the difference in the initial charge and the final solution for each of the monomers. The difference was incorporated into the final polymer. The stoichiometry of the final polymer was 68 mole % maleic anhydride, 18.6 mole % 1-octene, and 13.6 mole % 1,7-octadiene. Further characterization is presented in Tables 2 and 3 and in FIGS. 1 and 3 and discussed below.

This Example shows that terpolymers can be formed from the terpolymerization of mono-olefins, dienes, and maleic anhydride.

Example 10

This Example shows the effect of a chain transfer agent. Example 4 was repeated except 1,7-octadiene (22.0 g, 0.20 mol) and dodecylmercaptan (1.2 g) were added initially. The yield of desired copolymer product was 24.3 g. The $^{13}$C NMR in $CD_3CN$ showed 59 mole % maleic anhydride, 20 mole % unsaturated double bonds of the 1,7-octadiene, 14 mole % saturated 1,7-octadiene, 4 mole % benzoyl peroxide fragments, and 3 mole % dodecylmercaptan. Further characterization is presented in Table 2 and in FIG. 3, as discussed below.

Example 11

Example 10 was repeated except twice as much dodecylmercaptan chain transfer agent (2.4 g) was added initially. The yield of desired copolymer product was 19.0 g. The carbon-13 NMR in $CD_3CN$ showed 60 mole % maleic anhydride, 16 mole % unsaturated double bonds, 13 mole % saturated 1,7-octadiene, 6 mole % benzoyl peroxide initiator, and 5 mole % dodecylmercaptan.

This Example demonstrates that additional dodecylmercaptan will result in even lower molecular weights. Further characterization is presented in Table 2 and in FIG. 2, as discussed below.

Example 12

This Example shows use alternative dienes to 1,7-octadiene. 1,9-decadiene (55.2 g, 0.40 mol) and maleic anhydride (19.6 g, 0.20 mol) in acetone (200 g) was polymerized in the same apparatus and under the same conditions as Example 4. The yield of desired copolymer was 33.2 g. The $^1$H NMR showed 17 mole % vinyl octyl protons, 15 mole % saturated octyl protons, and 4.3 mole % phenyl protons from the benzoyl peroxide initiator. Further characterization is presented in Table 2 and in FIG. 2, as discussed below.

This Example shows that other dienes can result in hyperbranched polymers.

Example 13

This Example illustrates functionalization of the olefin on the outer core. The polymer from Example 1 (5 g, 0.033 mol) and Lodyne® 921 (5.3 g, 0.011 mol) (perfluorooctylethyl mercaptan manufactured by Ciba-Geigy) was dissolved in acetone (25 g) in a round bottomed flask equipped with a condenser, overhead stirrer, heating mantle, and nitrogen inlet. The solution was heated to 57° C. and purged subsurface with nitrogen for one hour. VAZO 64 (0.3 g) was then added. The solution was heated at 57° C. for 20 hours. The solution was then cooled to room temperature and poured into 100 ml of a 1:1 toluene-hexane mixture. The resulting solid was filtered and washed with 300 ml toluene and then hexane. It was dried in a vacuum oven at 70° C. The resulting analyses indicated 28.5% fluorine. The $^1$H NMR showed only 1.4 mole % of the vinyl protons remaining from the initial 16 mole % of Example 1. This shows that 91% of the vinyl protons reacted in a radical reaction with the mercaptan.

This Example demonstrates that the olefinic unsaturation of the hyperbranched polymer is reactive in a radical reaction. A sulfide chain was formed from the addition of the —SH across the double bond. Thiol-modified polymers are known to provide soil resistant properties when applied to substrates.

Example 14

This Example shows the use of an alpha-mono-olefin as comonomer with higher amount of olefin. 1,7-octadiene (2.75 g, 0.025 mol), 1-octene (14.4 g, 0.125 mol), maleic anhydride (19.6 g, 0.20 mol), and methyl isobutyl ketone (100 g) were added to the same apparatus as in Example 4. The solution was heated to 75° C. and the solution purged subsurface for one hour. Benzoyl peroxide (3.7 g) was added with a dropping funnel over a 20 minute period. The solution was allowed to react for 20 hours at 75° C. The solution was then allowed to cool. 70% of the solvent was removed with vacuum. The solution was added to 600 ml of a 50/50 toluene/hexane mixture to precipitate a light colored polymer. The polymer was filtered and washed with 300 ml toluene and the 300 ml hexane. It was dried in a vacuum oven at 60° C. The yield of the desired polymer was 23.8 g.

The reaction was monitored by following the disappearance of the 1-octene, 1,7-octadiene, and maleic anhydride by gas chromatography, as in Example 11. The stoichiometry of the final polymer was 61 mole % maleic anhydride, 31 mole % 1-octene, and 8.1 mole % 1,7-octadiene.

Example 15

This Example shows the use of an alpha-mono-olefin as comonomer with lower amount of olefin. 1,7-octadiene (11.0 g, 0.10 mol), 1-octene (5.75 g, 0.05 mol), maleic anhydride (19.6 g, 0.20 mol), and methyl isobutyl ketone (200 g) were added to the same apparatus as in Example 4. The solution was heated to 75° C. and the solution purged subsurface for one hour. Benzoyl peroxide (3.7 g) was added with a dropping funnel over a 20 minute period. The solution was allowed to react for 20 hours at 75° C. The solution was then allowed to cool. 70% of the solvent was removed with vacuum. The solution was added to 500 ml of a 50/50 toluene/hexane mixture to precipitate a light colored polymer. The polymer was filtered and washed with 300 ml toluene and the 300 ml hexane. It was dried in a vacuum oven at 60° C. The yield of the desired polymer was 24.0 g.

The reaction was monitored by following the disappearance of the 1-octene, 1,7-octadiene, and maleic anhydride by gas chromatography, as in Example 11. The stoichiometry of the final polymer was 65 mole % maleic anhydride, 9 mole % 1-octene, and 27 mole % 1,7-octadiene.

Examples 14 and 15 show yield remains similar while varying the amount of alpha-olefin in the polymer composition.

Example 16

This Example shows that the hyperbranched polymer architecture allows even high molecular weight polymers to be shipped at practical concentrations in aqueous solution at a practical viscosity. The polymer of Example 1, having a molecular weight, $M_w$, of 370,000, was hydrolyzed with an aqueous solution of sodium hydroxide at a 1:1 maleic anhydride:sodium hydroxide molar ratio at 70-80° C. for 3 hours to give a 30 wt % aqueous solution.

A Brookfield Digital Viscometer was used to measure the viscosity in centipoise (cps). Initially a silicone oil of known viscosity was used to calibrate the viscometer. An appropriate spindle was selected depending on the qualitative determination of the viscosity of the polymer solution. The RPM of the spindle was recorded from the digital readout. The RPM was then multiplied by the factor for the selected spindle to provide the final Brookfield viscosity measurement.

The Brookfield viscosity of the hydrolyzed polymer from Example 1 in a 23.3 wt % aqueous solution was 232 cps. The Brookfield viscosity, measured under the same conditions, of a 23.1 wt % aqueous solution of a commercial 1-octene-maleic anhydride copolymer, having a molecular weight (Mw) of 8000, was 196 cps. Thus, an aqueous solution of a polymer of this invention having a molecular weight of 370,000 has comparable viscosity to that of an aqueous solution of a polymer based on a linear olefin-maleic anhydride copolymer of much lower molecular weight.

Comparative Example 1

This Example shows the effect of not using dilute conditions. Example 1 was repeated except 140 g acetone was used instead of 800 g. The solution gelled in an hour after addition of benzoyl peroxide. The formation of a gel indicates that the polymerization has produced an unsatisfactory cross-linked polymer/solvent composition rather than the desired hyperbranched polymer.

Comparative Example 2

This Example shows the effect of using a diene having less than 7 carbon atoms. 1,5-hexadiene (32.9 g, 0.40 mol) and maleic anhydride (19.6 g, 0.20 mol) in acetone (200 g) were reacted in the same way as Example 1. A copolymer was isolated (29.3 g). The FTIR showed no band at 1630 cm$^{-1}$ due to an olefin and the $^1$H NMR showed no olefin resonances.

Comparative Example 3

This Example shows the effect of low diene-maleic anhydride ratio (0.5:1) at a higher temperature in MIBK. 1,7-octadiene (22 g, 0.20 mol), maleic anhydride (39.2 g, 0.40 mol), and methyl isobutylketone (400 g) were added to a one liter round bottomed flask equipped in the same way as Example 1 and heated to 75° C. The solution was purged subsurface with nitrogen for one hour. Then benzoyl peroxide (14.6 g, 0.06 mol) was added over a 30 minute period. Within 20 minutes the solution was cloudy. At the end of 20 hours a significant amount of insoluble material was present. 56 g of insoluble cross linked polymer was filtered. It was not possible to disperse the solid into an aqueous sodium hydroxide solution for performance testing.

This test shows that a combination of a lower 1,7-octadiene:maleic anhydride molar ratio and higher temperatures result in cross-linked polymer rather than hyperbranched polymer.

Characterization of Hyperbranched Polymers

Tables 2 and 3 show the results of measurements on the inventive polymers compared to well-known linear polymers. In these Tables, MA is maleic anhydride, MVE is methyl vinyl ether, and DDM is dodecyl mercaptan.

TABLE 2

Calculated Intrinsic Viscosity, [η], and Mark-Houwink Coefficients "K" and "α"

| Example | Polymer Components | Mw | Mw/Mn | [η] (ml/g) | "K" | "α" |
|---|---|---|---|---|---|---|
| 1 | 1,7-octadiene + MA | 370,000 | 12 | 9.2 | 0.047 | 0.42 |
| 4 | 1,7-octadiene + MA | 15,000 | 3.4 | 5.4 | 0.40 | 0.28 |
| 7 | 1,7-octadiene + MA | 130,000 | 6.4 | 7.8 | 0.35 | 0.27 |
| 9 | 1,7-octadiene + 1-octene + MA | 140,000 | 15 | 10 | 0.123 | 0.40 |
| 10 | 1,7-octadiene + MA + DDM | 70,000 | 1.5 | 6.8 | 0.03 | 0.48 |

TABLE 2-continued

Calculated Intrinsic Viscosity, [η], and Mark-Houwink Coefficients "K" and "α"

| | Polymer Components | Mw | Mw/Mn | [η] (ml/g) | "K" | "α" |
|---|---|---|---|---|---|---|
| 11 | 1,7-octadiene + MA + DDM | 30,000 | 1.4 | 5.0 | 0.092 | 0.39 |
| 12 Comparative | 1,9-decadiene + MA | 155,000 | 2.5 | 6.6 | 0.22 | 0.28 |
| — | Poly(MVE-MA) | 110,000 | 2.0 | 97 | 0.0092 | 0.80 |
| — | poly(ethylene-MA) | 280,000 | 4.0 | 151 | 0.090 | 0.60 |

TABLE 3

Calculated Radius of Gyration $R_g$ and Coefficient "B"

| | Polymer Components | $M_W$ | $M_W/M_N$ | $R_g$ (nm) | "B" |
|---|---|---|---|---|---|
| Example | | | | | |
| 1 | 1,7 octadiene + MA + DDM | 370,000 | 12 | 10 | 0.38 |
| 7 | 1,7 octadiene + MA | 130,000 | 6.4 | ~8 | 0.4 |
| 9 | 1,7 octadiene + 1-octene + MA | 140,000 | 15 | ~8 | 0.35 |
| Comparative | | | | | |
| — | Poly(MVE-MA) | 110,000 | 2.0 | 17 | 0.54 |
| — | Poly(ethylene-MA) | 280,000 | 4.0 | 25 | 0.5 |

Figure 2:
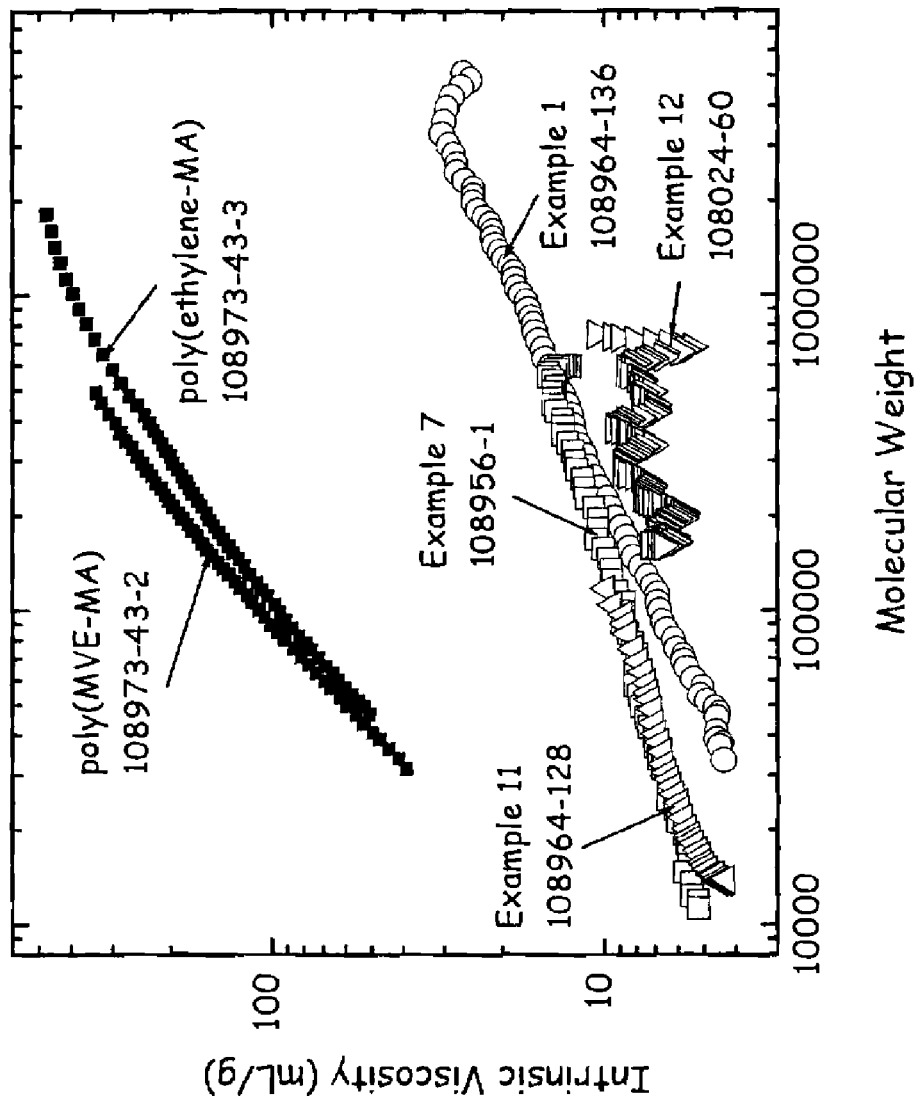
FIG. 2 is a graph of the intrinsic viscosity of polymers of the invention, prepared according to Examples 1, 7, 11 and 12 and comparative (linear) polymers as a function of weight average molecular weight, M.
Figure 3:
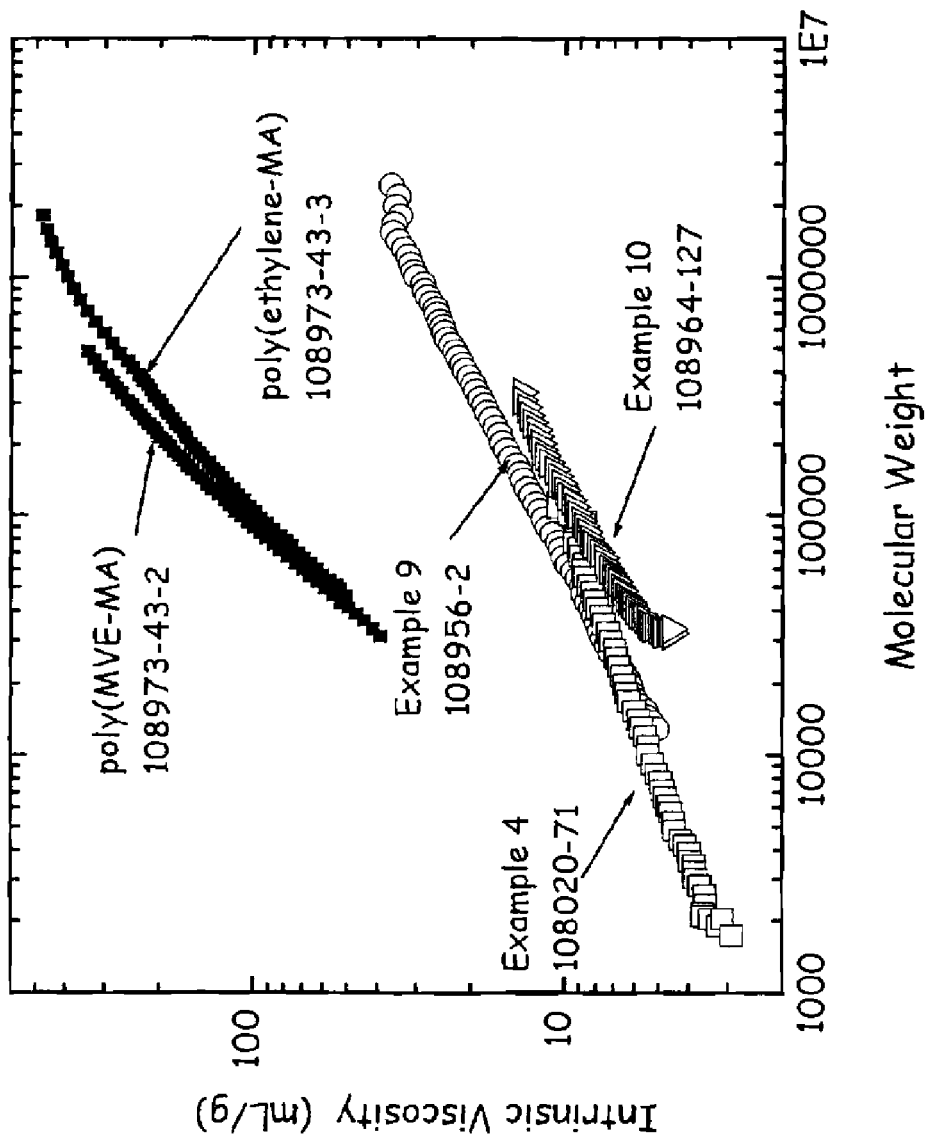
FIG. 3 is a graph of the intrinsic viscosity of polymers of the invention, prepared according to Examples 4, 9 and 10, and comparative (linear) polymers as a function of weight average molecular weight, M.

The above data are shown in graphical form in FIGS. 1-3. FIG. 1 is a graph of $R_g$ as a function of $M_i$ for the hyperbranched polymers prepared in Examples 1, 7 and 9 and for two linear polymers of similar chemistry, a copolymer of methyl vinyl ether and maleic anhydride and a copolymer of ethylene and maleic anhydride. $R_g$ and $M_i$ were determined by multi-angle light scattering on fractions of the polymer eluting from a size exclusion chromatograph (SEC) as described above. At similar molecular weights, $M_i$, the hyperbranched polymers exhibit much smaller values of $R_g$. This is a consequence of their densely branched structure, which limits the swelling in solution so that the effective volume pervaded by the hyperbranched polymer is very small compared to a linear polymer of similar chemistry and mass.

FIGS. 2 and 3 are graphs of the intrinsic viscosity, [η], as a function of $M_i$ for fractions of polymers eluting from a SEC as described above. Data was divided into the two graphs (FIGS. 2 and 3) for clarity. Data for seven Examples of hyperbranched polymers are illustrated in these graphs. Data for the hyperbranched polymers prepared in Examples 1, 7, 11 and 12 are shown in FIG. 2. Data for the hyperbranched polymers prepared in Examples 4, 9, and 10 are shown in FIG. 3. Data for the same two linear polymers of FIG. 1 are also shown in each graph of FIG. 2 and FIG. 3 for comparison. The hyperbranched polymers of this invention exhibit a substantially reduced size in comparison to linear polymers of similar chemistry and molecular weight. Intrinsic viscosity is a measure of volume rather than of length and thus the difference between the linear and hyperbranched polymers is more pronounced than for $R_g$ in FIG. 1.

The intrinsic viscosity versus molecular weight plot in the Figures show that the Mw/Mn and molecular weights are significantly less than those Examples run under comparable conditions (e.g., Example 1) in which no dodecylmercaptan was used.

As can be seen from these Figures, at a given molecular weight (or degree of polymerization), the hyperbranched polymers of the Examples of the invention have intrinsic viscosities which are at least an order of magnitude less than linear polymers of similar chemistry and molecular weight. Similarly, the radius of gyration, $R_g$, for the hyperbranched polymers of the invention prepared according to the Examples are significantly less than for the comparison linear polymers at similar molecular weight. Due to low [η], a more concentrated solution of hyperbranched polymer may be prepared and conveniently shipped relative to solutions of linear polymers of similar or even lower molecular weights.

Stain Test Results

Certain of the hyperbranched polymers of the Examples were hydrolyzed with an aqueous solution of sodium hydroxide at a 1:1 maleic anhydride:sodium hydroxide molar ratio at 70-80° C. for 3-6 hours to give a 30 wt % aqueous solution, and tested on the 6,6 nylon carpet described above in "Stain Test Methods". Each set of compositions was tested separately against a 1-octene-maleic anhydride (MA) stain resist composition prepared according to U.S. Pat. No. 5,707,708, Control. The Table is divided into appropriate sections, each section with a Control.

Stain Test Results on Nylon Carpet Fiber

TABLE 4A

| Polymer | % Coffee Blocked | 24 hour KA | 24 hour WAQE |
|---|---|---|---|
| Example 1 | 45 | 9 | 2 |
| Example 7 | 44 | 9 | 3 |
| Example 8 | 38 | 9 | 3 |
| Example 9 | 51 | 10 | 7 |
| Control | 36 | 6 | 8 |

TABLE 4B

| Polymer | % Coffee Blocked | 24 hour KA | 24 hour WAQE |
|---|---|---|---|
| Example 4 | 58 | 9 | 2 |
| Example 6 | 40 | 9 | 2 |
| Control | 47 | 9 | 4 |

TABLE 4C

| Polymer | % Coffee Blocked | 24 hour KA | 24 hour WAQE |
|---|---|---|---|
| Example 10 | 12 | 9.5 | 3 |
| Example 11 | 20 | 10 | 5 |
| Control | 17 | 10 | 7 |

TABLE 4D

| Polymer | % Coffee Blocked | 24 hour KA | 24 hour WAQE |
|---|---|---|---|
| Example 14 | 26 | 9 | 9 |
| Example 15 | 29 | 9 | 3 |
| Control | 34 | 9 | 8 |

Tables 4A to 4D generally indicate a comparable or superior 24 hour KOOL AID and % Coffee Blocked performance relative to 1-octene-maleic anhydride Control stain resist composition. Some of the terpolymers of dienes-monoenes-maleic anhydride (Examples 9 and 14) also show comparable WAQE performance relative to the 1-octene-MA Control.

What is claimed is:

1. A process to prepare a hyperbranched polymer comprising contacting maleic anhydride with at least one terminally unsaturated acyclic aliphatic diene, wherein the diene is selected from the group consisting of 1,7-octadiene, 1,9-decadiene, 1,11-dodecadiene, 1,13-tetradecadiene, 1,3,7-octatriene, and mixtures of two or more thereof, in the presence of an effective amount of a radical initiator in an aprotic solvent under dilute conditions to produce a polymer having maleic anhydride and the diene in the polymer backbone and wherein the polymer has at least one pendent olefinic group for each 10 polymer units.

2. A process for the preparation of a hyperbranched polymer comprising contacting maleic anhydride and at least one terminally unsaturated diene, wherein the diene is selected from the group consisting of 1,7-octadiene, 1,9-decadiene, 1,11-dodecadiene, 1,13-tetradecadiene, 1,3,7-octatriene, and mixtures of two or more thereof, and optionally at least one 1-alkene containing from 4 to 18 carbon atoms in an aprotic solvent, in the presence of an effective amount of a radical initiator wherein the molar ratio of diene to the maleic anhydride as charged is at least about 1:1 and the molar ratio of 1-alkene to the maleic anhydride as charged is from about 0 to about 0.9:1, wherein the concentration of monomers relative to the solvent is below about 50% by weight of solvent to produce a polymer having maleic anhydride and the diene in the polymer backbone and wherein the polymer has at least one pendent olefinic group for each 10 polymer units.

3. The process of claim 2 wherein the concentration of monomers in the solvent is below about 20% by weight of solvent.

4. The process of claim 2 wherein the solvent is selected from the group consisting of acetone, methylisobutylketone, and tetrahydrofuran.

5. The process of claim 2 wherein the radical initiator is an organic peroxide or azo compound.

6. The process of claim 2 further comprising adding a chain transfer agent while contacting the maleic anhydride with the diene.

7. The process of claim 2 wherein the reaction temperature is from about 40° C. to about 80° C.

8. The process of claim 2 further comprising recovering and purifying the hyperbranched polymer product.

9. The process of claim 2 wherein the concentration of monomers in the solvent is less than 30% by weight of solvent.

10. The process of claim 1 wherein the concentration of monomers in the solvent is less than 50% by weight of solvent.

11. The process of claim 1 wherein the concentration of monomers in the solvent is less than 30% by weight of solvent.

12. The process of claim 1 wherein the concentration of monomers in the solvent is less than 20% by weight of solvent.

* * * * *